United States Patent [19]

Adams

[11] 4,268,070
[45] May 19, 1981

[54] ORIFICE FLANGE CLAMP

[76] Inventor: Harold R. Adams, St. Francisville, Ill. 62460

[21] Appl. No.: 911,379

[22] Filed: Jun. 1, 1978

[51] Int. Cl.³ .................. F16L 23/02; F16L 55/16; F16L 55/18
[52] U.S. Cl. .................. 285/15; 29/157 R; 29/402.02; 29/402.18; 138/44; 138/45; 138/97; 138/99; 285/172; 285/297; 285/18; 285/363; 137/15
[58] Field of Search .............. 138/44, 45 A, 97, 99; 285/15, 171, 172, 284, 297, 363, 373, 405, 368, 412; 29/401 A, 401 C, 401 D, 401 R, 157 R, 402.02, 402.18; 137/15

[56] References Cited

U.S. PATENT DOCUMENTS

| 826,931 | 7/1906 | Gordon | 285/368 X |
| 866,395 | 9/1907 | Skinner et al. | 285/363 X |
| 1,206,185 | 11/1916 | Weymouth | 138/44 |
| 1,620,154 | 3/1927 | Furman | 285/363 X |
| 1,631,264 | 6/1927 | Haldeman | 138/44 |
| 1,913,860 | 6/1933 | Spink | 138/44 X |
| 2,271,549 | 2/1942 | Henderson | 285/363 X |
| 2,338,307 | 1/1944 | Staggers | 285/373 X |
| 2,407,951 | 9/1946 | Daniel | 138/44 |
| 2,547,321 | 4/1951 | Henderson | 285/363 X |
| 3,246,916 | 4/1966 | Hansen | 285/363 X |
| 3,603,616 | 9/1971 | Smith | 138/97 X |
| 4,133,351 | 1/1979 | Harrison et al. | 285/15 X |

FOREIGN PATENT DOCUMENTS

| 188708 | 11/1922 | United Kingdom | 285/297 |
| 335650 | 10/1930 | United Kingdom | 285/363 |
| 411472 | 6/1934 | United Kingdom | 138/97 |
| 577029 | 5/1946 | United Kingdom | 285/284 |

OTHER PUBLICATIONS

*Tube Turns ® Forged Flanges, Catalogue, pp. 138-139 (A Div. of Chemitron Corp., Box 32160, Louisville, KY 40232).*

Primary Examiner—Francis K. Zugel
Assistant Examiner—Carl F. Pietruszka
Attorney, Agent, or Firm—Glenn K. Robbins

[57] ABSTRACT

An orifice flange clamp for use with a pair of butted together pipe line orifice flanges. The clamp is comprised of a pair of semi-circular bands adapted to be clamped together around the periphery of the butted together orifice flanges at their interface. The bands have cut-out sections fitting around the conventional test plugs on the orifice flanges. Plugs are provided for sealing off the break-away bolt holes. A specially devised pumping collar is provided for pumping sealant through a flange bolt hole. This pumping collar comprises an elongated bolt-like member having a reduced diameter fitted through opposed flange holes with nuts at both ends in order that a pumping collar having a loose fit over the elongated bolt-like member can be drawn tight. The pumping collar is provided with a port which receives a sealant line for pumping sealant at high pressure through the port and through the collar to the interface between the butted together flanges.

6 Claims, 5 Drawing Figures

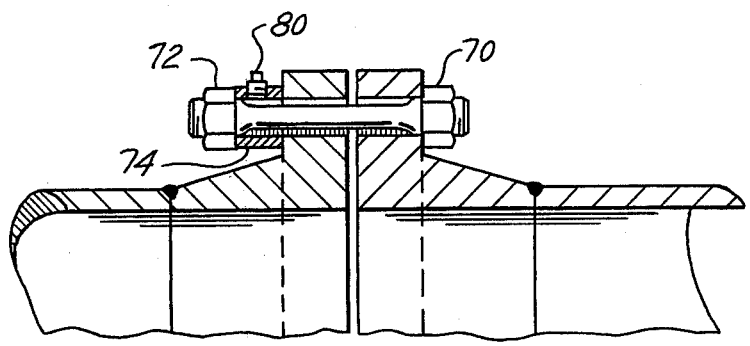
FIG. 11
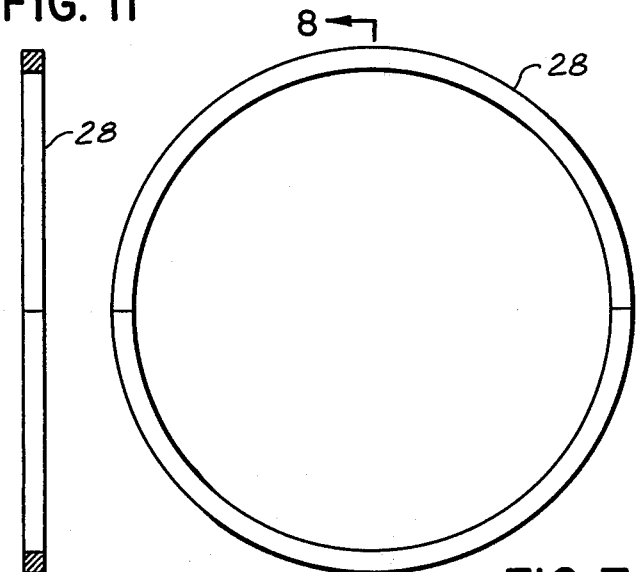
FIG. 7
FIG. 8
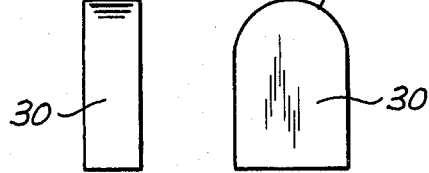
FIG. 10  FIG. 9
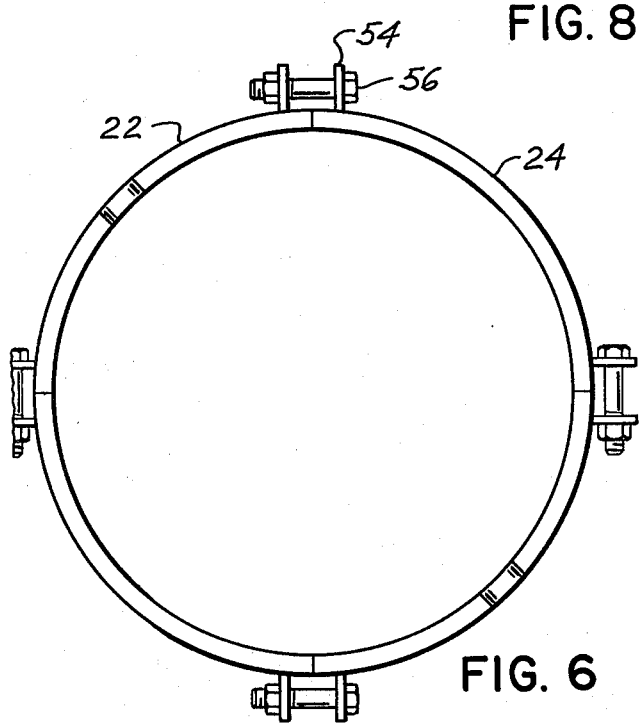
FIG. 6
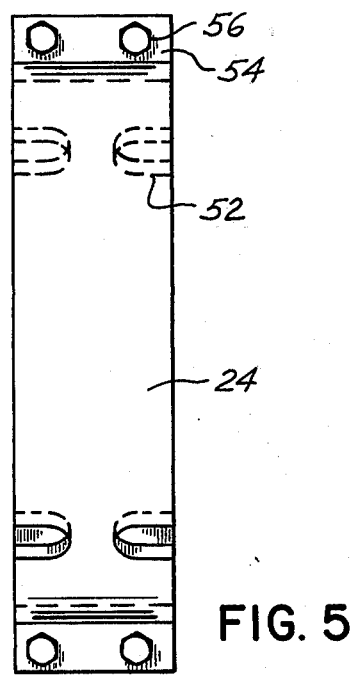
FIG. 5

ORIFICE FLANGE CLAMP

BACKGROUND OF THE INVENTION

Pipe line orifice flanges are conventionally found in various types of industrial installations including chemical plants, the petroleum industry and other various installations where high pressure lines are employed. Such orifice pipe line flanges are usually comprised of a pair of flanges welded to a pipe line. The flanges are adapted to be butted together and connected with an interior orifice plate held by the flange to provide a restricted orifice within the interior of the flange fitting. Such orifice plates may be of different diameter as will be readily understood in the art and are used for testing and measuring the fluid characteristics in a conventional fashion. Such flanges are usually provided with test plugs on both sides of the interior orifice plate in order that the upstream and downstream pressure may be measured or tested in one fashion or another.

The orifice flange fitting are further usually provided with break-away bolts. This is simply a threaded opening or the like in one flange receiving a bolt which can be tightened against a solid surface of the opposing flange to break the flange apart for repair or the like. The orifice flanges in the field are generally connected together by simple connecting bolts clamping the flanges tightly together and it will be understood that various types of sealant and gaskets are used to provide a sealed interface between the flanges.

It will be readily understood that such orifice flanges have in the past been subject to the usual wear and tear and failure in the field. When it is realized that such pipe line flanges are quite often very large and situated at remotely accessible areas the repair and maintenance can be quite difficult. The pipe lines involved are quite often very large and handle large quantities of fluid. Break-away and repair can involve a great amount of capital expenditure, time and labor.

By means of the instant invention there has been provided an orifice flange that can be simply employed in the field to pump sealant in the interface between the flanges to prevent any leakage therethrough. The flange clamp can be used on the existing orifice flange assembly without requiring breakdown. Thus when used in the field by a repair man the orifice flange can be maintained in operation for a long period of time until complete overhaul and replacement is desired.

This invention comprises a flange clamp which basically contitutes the pair of semi-cylindrical clamps which can be clamped over the orifice flanges with cut-outs to accomodate the conventional test plugs employed and without requiring of their removal. The semi-circular clamp further receives sealing ring halves which are adapted to be pressed into the interface between the flanges. A special sealing means is provided by an elongated member in the nature of a necked bolt threaded at both ends which is adapted to be fitted through a pair of opposed flange openings which normally receive a flange connecting bolt. The elongated member receives nuts at both ends so that it can be drawn tight against the pumping collar fitting over the elongated member at one end.

The pumping collar has a larger internal diameter than the external diameter of the elongated bolt-like member in such a fashion that a port which is adapted to receive a sealant pumping gun or the like can pass the sealant through the port and through the passage way defined by the necked outside of the elongated member and the interior of the pumping collar. The sealant then finds its way through a passage defined by the interior of the flange bolt hole opening and the exterior of the reduced diameter elongated member into the interface between the two flanges. The pumping collar is connected tightly against the exterior of the flange by nuts on both ends of the elongated member so that a sealed fit is provided for the pumping operation.

The orifice flange clamp of this invention is further provided with plug members which are adapted to plug the break-away bolt openings which are conventionally provided in the orifice flange assembly.

Thus by means of the instant invention there has been provided an orifice flange clamp which can be simply fitted over an orifice flange without requiring breakdown or removal of the affected parts. The clamp once it is assembled can be simply used to pump sealant through the pumping collar and provide for tight seal of the orifice flange assembly so that break-away is not required and continuous operation can be provided. The use of the test plugs is not interrupted by the repair provided by the orifice flange of the instant invention and the entire clamping operation can be effected in the field at remote locations on an emergency basis without the requirement of complicated break-down and repair mechanism.

The above features of this invention and further objects will appear in the detailed description which follows and will be otherwise apparent to those skilled in the art. For the purpose of illustration of this invention there is shown in the accompanying drawings a preferred embodiment thereof. It is to be understood that these drawings are for the purpose of example only and that the invention is not limited thereto.

IN THE DRAWINGS

FIG. 5, is a top plan view of the flange clamp assembly;

FIG. 6, is a side view of the flange clamp assembly taken from the right side of FIG. 5;

FIG. 7, is a plan view of the semi-circular sealing rings;

FIG. 8, is a view in section taken on the line 8—8 of FIG. 7;

FIG. 9, is a plan view of the break-away bolt hole sealing plug;

FIG. 10, is a view in side elevation taken from the right side of FIG. 9;

FIG. 11, is a fragmentary view partly in axial section showing the elongated member with the pumping collar fitted through flange holes in the orifice flanges;

FIG. 15 is a view in section taken on line 15—15 of FIG. 12.

DESCRIPTION OF THE INVENTION

Figure 12:
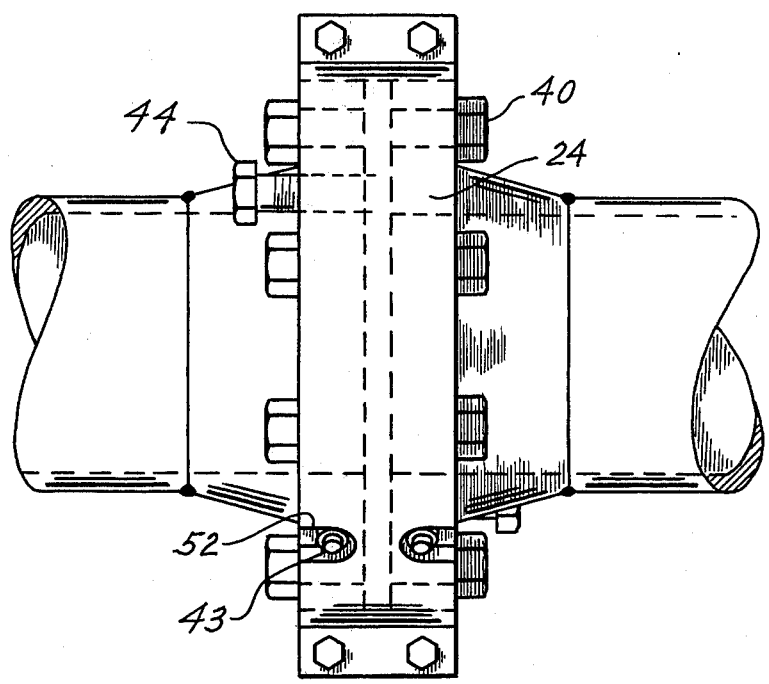
FIG. 12, is a top plan view showing the orifice flange clamp assembled on the orifice flange.
Figure 13:
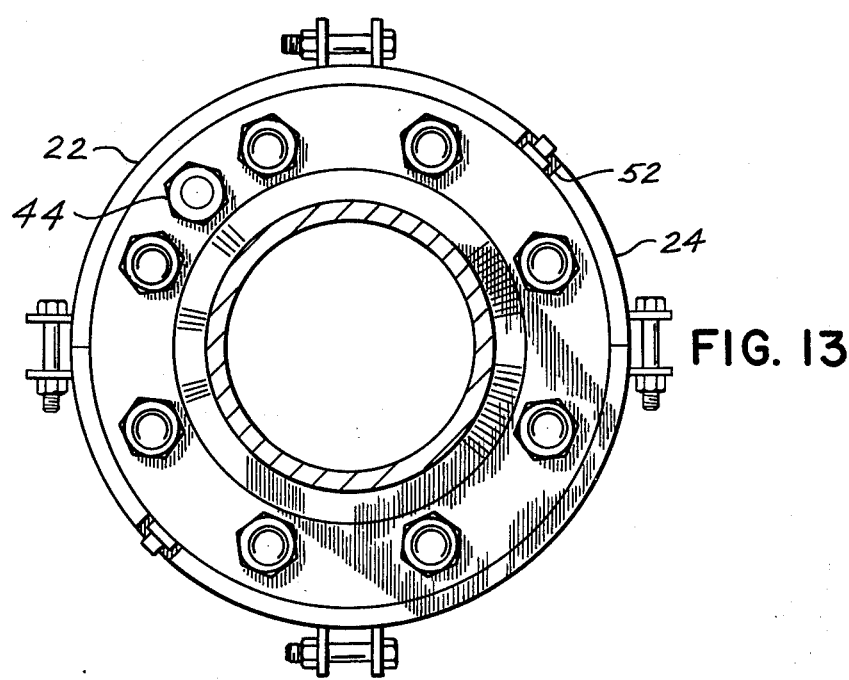
FIG. 13, is a view in side elevation of the orifice flange clamp taken from the left side.

The orifice flange clamp of this invention is generally designated by the reference numeral 20. As best shown in assembly in FIGS. 11, 12 and 14 it is comprised of a pair of semi-circular flange clamps 22 and 24, a pumping collar generally designated by the reference numeral 26, a pair of sealing ring segments 28 and break-away bolt hole plugs 30 shown in FIGS. 9 and 10.

Figure 1:
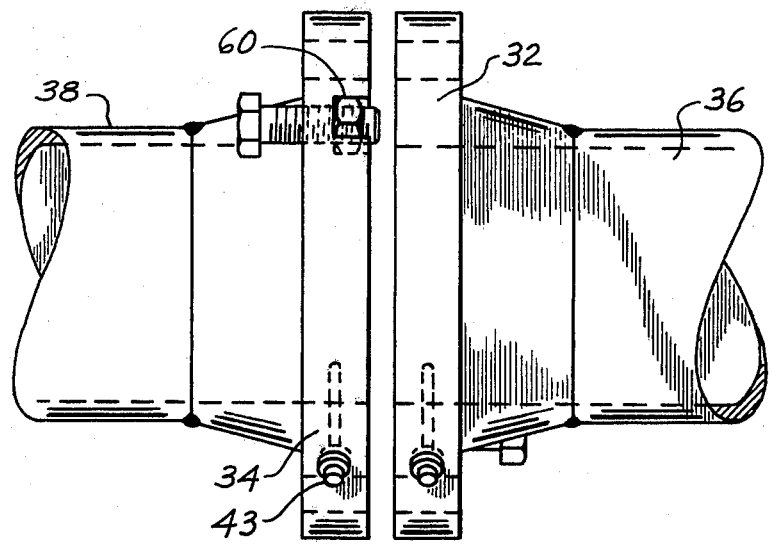
FIG. 1, is a top plan view of an orifice flange assembly.
Figure 2:
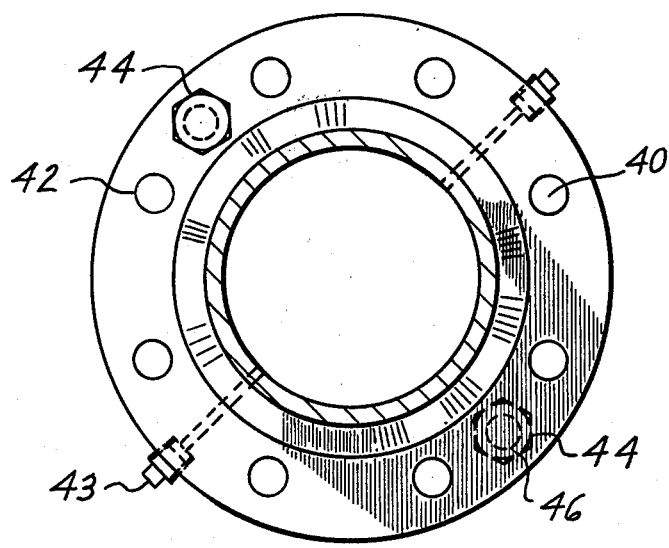
FIG. 2, is a side view taken from the left side of the orifice flange assembly.
Figure 3:
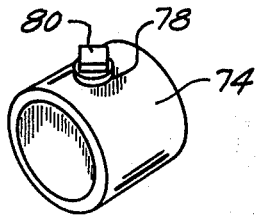
FIG. 3, is a pictorial view of the pumping collar of this invention.
Figure 4:
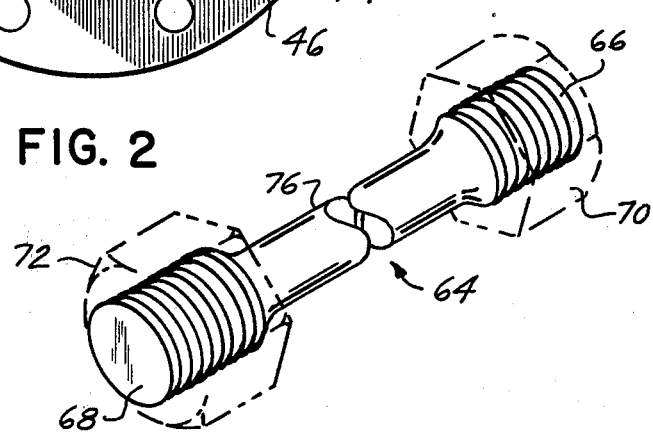
FIG. 4, is a pictorial view showing partly hidden parts of the elongated bolt-like member with the tightening nuts.

The orifice flange assembly in which the instant orifice flange clamp and pumping means are employed is best shown in FIGS. 1 and 2. The orifice flange assembly is of conventional construction and is comprised of a pair of orifice flanges 32 and 34 welded or otherwise connected to conventional pipe members 36 and 38 respectively. The orifice flange assembly as is the usual practice is provided with an interior orifice plate (not shown) and is adapted to be connected together by conventional connecting and tightening bolts 40 fitting through flange bolt hole openings 42. The orifice flange assembly is further provided with test plugs 43 and a pair of diametrically opposed break-away bolts 44 fitting through a threaded opening 46 in each flange and bearing against a solid flange wall in the opposite flange to break the flanges apart when major repair is required.

The semi-circular flange clamps 22 and 24 are best shown in FIGS. 5, 6, 12, 13 and 14. As there shown they are comprised of a pair of semi-circular band-like members 50 having arcuate cut-out portions 52. The arcuate cut-out portions 52 are designed to fit around and accommodate test plugs 43 provided on the exterior of the orifice flanges.

The semi-circular flange clamp members are further provided with flanges 54 which receive connecting bolts 56 for drawing the semi-circular clamps tightly around the orifice flanges in the sealing operation.

The sealing ring members 28 are each semi-circular and are best shown in FIGS. 7 and 8. They are adapted to fit underneath the flange clamp at the interface between the flange in the relationship shown in FIG. 14.

In order to seal off the break-away bolt holes designated by the reference numeral 46 the plugs 30 are employed. They are best shown in FIGS. 9 and 10 and are constructed of rigid plate-like material such as steel or the like with an arcuate surface 58 adapted to engage the semi-circular bottom of the opening 60 in the flange (FIG. 1) and which connects with the break-away bolt hole opening.

The pumping collar mechanism is generally designated by the reference numeral 26 as best shown in FIGS. 3, 4, 11 and 14. This mechanism is comprised of an elongated bolt-like member 64 which has threaded ends 66 and 68. Conventional tightening nuts 70 and 72 are adapted to fit on the threaded ends whereby the pumping collar 74 can be drawn tightly against the orifice flange.

The pumping collar 74 is of a tubular like construction and has an inner diameter larger than the exterior diameter of the reduced diameter (necked) portion 76 of the elongated member. The exterior of the collar 74 is of a sufficient diameter whereby it fits against the side of the adjacent tightening nut 72 employed on the elongated member. The pumping collar 74 is further provided with a port 78 which receives a closure plug 80.

Figure 14:
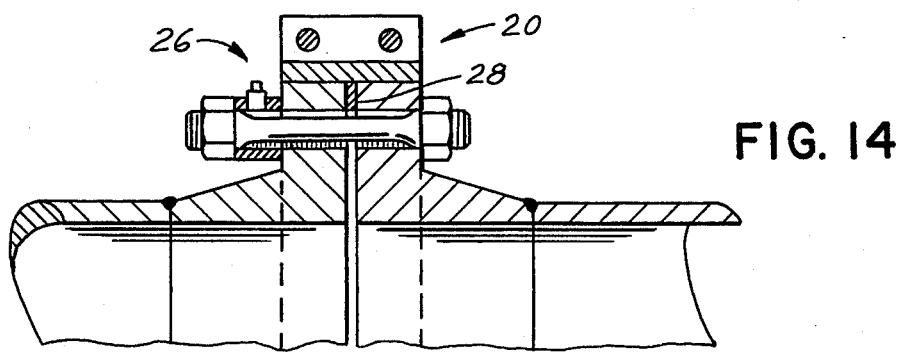
FIG. 14, is a view partly in axial section taken similarly to FIG. 11, showing the flange clamp, pumping collar and sealing ring assembled on the orifice flange assembly.

The port 78 when opened by removal of the closure 80 receives a sealant gun, high pressure sealant line or the like in order to pump sealant through the port, through the collar past the elongated necked portion 76 through the interior of the bolt hole through which the elongated member is fitted to the interface between the orifice flanges. This relationship is best shown in FIG. 14 where the pumping collar is assembled over the elongated member and drawn tightly against the side of the orifice flange.

USE

The orifice flange clamp of this invention is simply employed in the field for use on conventional orifice flanges. When it is desired to repair a leak in the interface between the orifice flanges the flange clamps and pumping collar are designed to be simply installed.

In the installation the break-away bolt is withdrawn and the plug 30 is inserted in the opening 60. The semi-circular sealing rings are placed around the interface between the orifice flanges. After this is been accomplished the two semi-circular flange clamps are fitted over the exterior of the orifice flanges making sure that the cut-out openings are so placed to receive the test plugs. After this is effected the flange clamps are drawn tightly together by the connecting bolts 56.

The pumping collar is then installed by removing a flange bolt through the matching or registering openings in the orifice flanges. Once this is accomplished the elongated member is fitted through the mating openings with the nut 70 on one end and the pumping collar is slipped over the opposite end. The tightening nut 72 is then fitted over the threaded end of the elongated member and drawn tightly so as to clamp the pumping collar against the face of the orifice flange against with which it butts.

After the pumping collar has been connected and the flange clamp has been securely tightened as aforementioned a sealant is then pumped through the port 78 on the pumping collar. The sealant flows through the port hole into the interface between the orifice flanges. Pumping is continued until the desired sealing has been provided.

The entire clamping and sealing operation as above described is simply effected in the field. By means of the instant invention such repair can be effected on various types of orifice flanges without interruption while accommodating the use of the conventional test plugs and not requiring their removal.

Various changes and modifications may be made within this invention as will be readily apparent to those skilled in the art. Such changes and modifications are within the scope and teaching of this invention as defined by the claims appended hereto.

What is claimed is:

1. An orifice flange clamp for use with an orifice flange comprised of a pair of oppositely extending conduits fixed to opposed flanges adapted to be drawn toward one another against an intermediate orifice plate, said clamp comprising a circular band adapted to be clamped on the periphery of said flanges sealing the exterior peripheral interface therebetween and means for introducing a fluid sealant under pressure in the interior interface between said flanges, said means comprising an elongated member fitting through a pair of opposed flange holes having a first end secured to one of said flanges and a reduced intermediate portion fitting loosely within a flange hole in an opposed flange and extending therethrough to a second end, collar means fitting loosely over said extending end, a plurality of arcuate sealing ring segments fitted end to end at the interface of said opposed flanges in peripheral sealing relation and nesting in engaging relation with the interior of said band and means for introducing sealant into said collar past the eleongated member and through the flange hole between said sealing rings and said orifice plate into the interface between the opposed flanges to seal the same, the flanges having plug means on the periphery thereof and said band having cut-out means receiving said plug means therethrough.

2. The clamp of claim 1, in which one of the flanges is provided with an axially extending break-away bolt hole and a plug member is fitted in a radial opening extending from said bolt hole to the outside of the flange.

3. The clamp of claim 2, in which the plug member has an arcuate first end registering in nested relation within a side surface of said break-away bolt hole and a second arcuate end engageable with said clamp whereby the tightening of the clamp forces the plug against the sided surface of the break-away bolt hole.

4. The clamp of claim 1, in which said first end extends through a flange hole and is threadedly connected to a nut and said extension is threadedly connected to a nut adapted to be tightened against said collar means to force said collar against a flange in sealing relation, the flanges have plug means on the periphery thereof and said band has cut-out means receiving said plug means therethrough, the plug member has an arcuate first end registering in nested relation within a side surface of said break-away bolt hole and a second end engageable with said clamp whereby the tightening of the clamp forces the plug against the side surface of the break-away bolt hole.

5. An orifice flange clamp for use with an orifice flange comprised of a pair of oppositely extending conduits fixed to opposed flanges adapted to be drawn toward one another against an intermediate orifice plate, said clamp comprising a circular band adapted to be clamped on the periphery of said flanges sealing the exterior peripheral interface therebetween and means for introducing a fluid sealant under pressure in the interior interface between said flanges, said means comprising an elongated member fitting through a pair of opposed flange holes having a first end secured to one of said flanges and a reduced intermediate portion fitting loosely within a flange hole in an opposed flange and extending therethrough, collar means fitting loosely over said extending end, a plurality of arcuate sealing ring segments fitted end to end at the interface of said opposed flanges in peripheral sealing relation and nesting in engaging relation with the interior of said band and means for introducing sealant into said collar past the elongated member and through the flange hole between said sealing rings and said orifice plate into the interface between the opposed flanges to seal the same, one of the flanges being provided with an axially extending break-away bolt hole and a communicating radially extending opening and a plug member fitted in said radial opening entending from said bolt hole to the outside of the flange.

6. The clamp of claim 5, in which the plug member has an arcuate first end registering in nested relation with a side surface of said break-away bolt hole and a second end engageable with said clamp whereby the tightening of the clamp forces the plug against the side surface of the break-away bolt hole.

* * * * *